United States Patent [19]

Schrunk

[11] 4,323,423

[45] Apr. 6, 1982

[54] DECORATIVE GLASS CHIPPING METHOD

[76] Inventor: Thomas R. Schrunk, 2306 NE. Garfield St., Minneapolis, Minn. 55418

[21] Appl. No.: 186,318

[22] Filed: Sep. 11, 1980

Related U.S. Application Data

[63] Continuation of Ser. No. 48,891, Jun. 18, 1979, abandoned.

[51] Int. Cl.[3] .......................... B44C 1/22; C03C 15/00; C03C 25/06

[52] U.S. Cl. .................................... 156/645; 156/654; 156/663

[58] Field of Search .................... 65/31; 156/635, 638, 156/645, 654, 655, 657, 658, 659.1, 663

[56] References Cited

U.S. PATENT DOCUMENTS

| | | | |
|---|---|---|---|
| 495,375 | 4/1893 | Sanary | 156/645 |
| 3,183,140 | 5/1965 | Gibson | 156/659.1 X |

*Primary Examiner*—William A. Powell
*Attorney, Agent, or Firm*—Wayne B. Easton

[57] ABSTRACT

The invention relates to a method of making a chipped glass panel having a decorative design or pattern which involves spreading a layer of glue on a glass panel. After the layer of glue dries its adhesion to the glass and its tensile strength cause tearing of conchoidal chips from the glass surface, leaving a characteristic effect. Prior to hardening, the glue layer is cut with a sharp instrument to define the edges of the desired chipped areas and portions of the glue layer in adjacent clear or frosted areas are removed. This cutting of the partially hardened glue and the subsequent removal of portions of the glue layer provide sharply delineated edges for the desired chipped areas.

1 Claim, 1 Drawing Figure

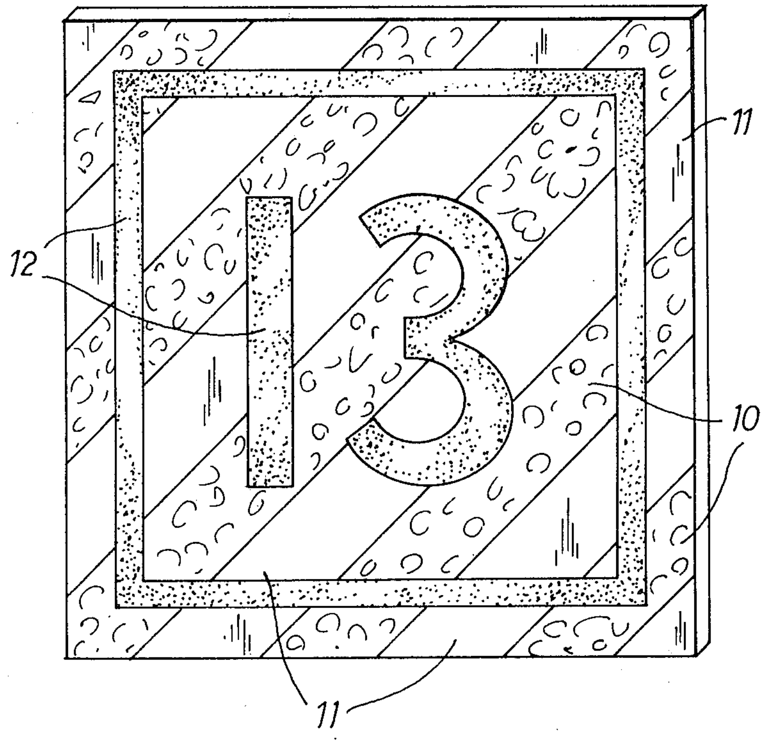
11
12
10
11

DECORATIVE GLASS CHIPPING METHOD

This application is a continuation of application Ser. No. 48,891, filed June 18, 1979 for "Decorative Glass Chipping Method", now abandoned.

The invention relates to an improvement in the method of making decorative chipped glass panels.

A chipped glass panel is made in a known manner by first spreading a layer of glue on a glass surface. After the glue dries and hardens, its adhesion to the glass and its tensile strength developed through shrinkage are such as to literally tear up conchoidal chips from the glass surface, leaving a characteristic effect. Sandblasting or chemical etching, as a preliminary to the application of the glue, gives the glue a better chance to adhere, and produces a more extreme effect.

The chipping treatment gives an overall beautiful effect but a previous problem with it is that the boundaries of the desired chipped area could not be cleanly delineated relative to adjacent areas which were desired to be either clear or frosted. The reason for the lack of delineation is the relative ruggedness of the chipping action which tends to produce ragged boundary edges.

A main object of the invention is to produce a new and improved method for utilizing the chipping effect for desired areas of a glass panel but provides or results in cleanly delineated edges between the desired chipped areas and adjacent area which may be frosted and/or clear as desired.

Other objects of the invention will become apparent from the following specification, drawing and appended claims.

The FIGURE of the drawing shows a single FIGURE which represents a glass panel made in accordance with the invention having clear, chipped and frosted surface areas.

With reference to the drawing the method of the invention begins by providing a piece or panel of glass of any desired shape and thickness and a smooth surface. The glass panel would normally be clear or colorless for aesthetic reasons but this is not essential to the invention and could have color or even be a mirror.

A design is chosen which includes one or more chipped surface portions 10, one or more clear or untreated surface portions 11 and/or one or more etched or frosted surface portions 12.

If the design has clear surface portions 11, the first step in the method is to use masking tape or a stencil cut from a sheet of soft rubber for masking the desired clear surface portions 11. The next step is to treat the entire surface of glass by a chemical etching process, or a mechanical surface roughening process, to roughen the unmasked portions and also give them a frosted appearance.

Chemical etching could be done by directing jets of hydrofluoric acid containing ammonium salts against the surface. The alternative mechanical roughening process could be done by any known sandblasting technique such as by blowing a relatively coarse, rough grained sand against the glass by compressed air.

The chipping step is performed by spreading a layer of a special glue over the entire glass surface. This glue may be a hide glue which has the two properties of being very strong and being subject to substantial shrinking upon drying. The glue is applied at the rate of 1 to $1\frac{1}{2}$ ounces per square foot, which is a thickness of about 1/16 inch, and is heated to a temperature of 140° to 150° F.

During a fairly definite period of time after the glue has begun to dry but while some water still remains, the glue is cut or scribed with a sharp instrument such as a knife on the borders of all of the areas 10 to be chipped internally of the perimeter of the piece of glass. The glue from all the desired frosted and clear areas is removed as by peeling.

The period of time referred to is relatively critical to the extent that the glue must be given sufficient time to partially set or harden so that it can be cut but not so much time that the chipping action begins.

When further drying of the glue occurs the adhesion of the glue to the glass and the tensile strength therein due to shrinkage causes the glue to literally tear up conchoidal ships from the glass in a random pattern which gives a characteristic effect. This final drying of the glue may be hastened by gently heating the glass.

The scribing of the glue along the borders of the desired chipped areas and the removal of the glue from the other areas has the effect that all the edges of the desired chipped areas are sharp and well defined and delineated to the extent that no chipping whatsoever occurs beyond such edges in the frosted or clear areas.

What is claimed is:

1. A method for making a decorative pane of glass having a total area consisting of desired clear, etched and chipped areas with clearly delineated boundaries therebetween, comprising the steps of providing a pane of glass, etching predetermined areas of said glass which include only said desired etched and chipped areas to provide predetermined etched areas and said desired clear areas, applying a layer of glue having shrinkage characteristics to said glass to at least cover said desired chipped areas, forming scribed lines in said layer of glue during a time interval after said layer has begun to harden but prior to any appreciable adhesion of said layer to said glass, said scribed lines including a first set of lines which trace the boundaries of said desired chipped areas relative to the boundaries of said desired clear areas within the periphery of said pane of glass, said scribed lines including a second set of lines laterally within the boundaries of said predetermined etched areas which constitute the only means employed to form boundaries between said desired chipped areas and said desired etched areas, and removing the portion of said layer of glue covering said desired etched and clear areas during said time interval.

* * * * *